US008970853B2

(12) United States Patent
Takabayashi et al.

(10) Patent No.: US 8,970,853 B2
(45) Date of Patent: Mar. 3, 2015

(54) THREE-DIMENSIONAL MEASUREMENT APPARATUS, THREE-DIMENSIONAL MEASUREMENT METHOD, AND STORAGE MEDIUM

(75) Inventors: Shiki Takabayashi, Tokyo (JP); Tetsuri Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/702,360

(22) PCT Filed: Jun. 9, 2011

(86) PCT No.: PCT/JP2011/063751
§ 371 (c)(1),
(2), (4) Date: Dec. 6, 2012

(87) PCT Pub. No.: WO2012/002152
PCT Pub. Date: Jan. 5, 2012

(65) Prior Publication Data
US 2013/0076896 A1    Mar. 28, 2013

(30) Foreign Application Priority Data

Jun. 29, 2010 (JP) ................................ 2010-148026

(51) Int. Cl.
*G01B 11/25* (2006.01)
*H04N 7/18* (2006.01)
(52) U.S. Cl.
CPC ............ *G01B 11/25* (2013.01); *G01B 11/2536* (2013.01); *H04N 7/18* (2013.01)
USPC ........................................................ 356/610
(58) Field of Classification Search
CPC ...... G01B 11/25–11/2545; G06T 2207/10152; G02B 5/1842; G02B 21/00; G06K 9/3216
See application file for complete search history.

(56) References Cited

U.S. PATENT DOCUMENTS

| | | | | |
|---|---|---|---|---|
| 4,202,612 A | * | 5/1980 | Di Matteo et al. | 356/394 |
| 4,259,589 A | * | 3/1981 | DiMatteo et al. | 356/610 |
| 4,634,279 A | * | 1/1987 | Ross et al. | 356/610 |
| 4,653,104 A | * | 3/1987 | Tamura | 356/610 |
| 4,846,577 A | | 7/1989 | Grindon | |
| 6,754,370 B1 | * | 6/2004 | Hall-Holt et al. | 382/107 |
| 7,724,379 B2 | * | 5/2010 | Kawasaki et al. | 356/603 |

(Continued)

FOREIGN PATENT DOCUMENTS

| | | |
|---|---|---|
| EP | 0294577 A | 12/1988 |
| JP | 3996560 B2 | 3/2005 |
| WO | 2009/019966 A1 | 2/2009 |

*Primary Examiner* — Tarifur Chowdhury
*Assistant Examiner* — Juan D Valentin, II
(74) *Attorney, Agent, or Firm* — Fitzpatrick, Cella, Harper & Scinto

(57) ABSTRACT

A three-dimensional measurement apparatus for calculating three-dimensional shape information of a target object, comprising: capturing means for capturing reflected pattern light of stripe pattern light formed by alternately arranging a bright portion and a dark portion as first image data, and capturing reflected pattern light of reversed stripe pattern light formed by reversing the bright portion and the dark portion of the stripe pattern light as second image data; determination means for determining a boundary position between the bright portion and the dark portion based on the first image data and the second image data; and reliability calculation means for calculating a reliability indicating accuracy of the boundary position from a correlation between a first luminance gradient of the first image data and a second luminance gradient of the second image data.

23 Claims, 7 Drawing Sheets

(56) References Cited

U.S. PATENT DOCUMENTS

| | | | |
|---|---|---|---|
| 8,436,890 B2 * | 5/2013 | Mamiya | 382/154 |
| 2002/0164066 A1 * | 11/2002 | Matsumoto | 382/154 |
| 2010/0194855 A1 | 8/2010 | Mamiya | |
| 2012/0133954 A1 * | 5/2012 | Takabayashi et al. | 356/610 |
| 2013/0046506 A1 | 2/2013 | Takabayashi | |

* cited by examiner

PRIOR ART

PRIOR ART

PRIOR ART

THREE-DIMENSIONAL MEASUREMENT APPARATUS, THREE-DIMENSIONAL MEASUREMENT METHOD, AND STORAGE MEDIUM

TECHNICAL FIELD

The present invention relates to a three-dimensional measurement apparatus, a three-dimensional measurement method, and a storage medium, which measure a three-dimensional shape by a spatial coding method which acquire distance information by projecting a plurality of patterns of pattern light formed by arranging bright and dark portions with arbitrary widths.

BACKGROUND ART

Pattern projection methods, which measure shapes using the principle of triangulation based on deformations of patterns by projecting a plurality of patterns of pattern light onto an object, and capturing an image of the object on which the pattern light images are projected, are known. Of these methods, a spatial coding method which binary-encodes a space by projecting stripe pattern light formed by alternately arranging bright and dark portions to have arbitrary widths is well known in the field of three-dimensional measurements, and products which adopt this method are commercially available.

The arrangement of a general apparatus for measuring a three-dimensional shape and the concept of a three-dimensional measurement will be described below with reference to FIG. 1. A three-dimensional measurement apparatus is generally configured by a projector 101 which irradiates on an object to be measured with a pattern, and a camera 102 which captures an image of the reflected pattern. The projector 101 projects stripe pattern light on an object 103 by alternately arranging bright and dark portions to have arbitrary widths. The stripe pattern light has a plurality of predetermined pattern shapes. Every time the stripe pattern light of a given pattern shape is projected, the camera 102 captures an image of that pattern to acquire it as image data. Let (X, Y, Z) be a boundary position between bright and dark portions on the object 103. Let (X1, Y1) be a principal point position of the projector 101 when the boundary position (X, Y, Z) and the projector 101 are coupled by a line. Likewise, let (X2, Y2) be a principal point position of the camera 102 when the boundary position (X, Y, Z) and camera 102 are coupled by a line. In this case, the principal point position (X2, Y2) of the camera 102 is a point calculated based on horizontal coordinates of an image sensor (for example, a CCD or CMOS) of the camera 102. The horizontal coordinates are determined by horizontal and vertical widths of the image sensor. For example, in case of an image sensor of 640×480, an x coordinate in the horizontal direction assumes a value ranging from 0 to 640, and a y coordinate in the vertical direction assumes a value ranging from 0 to 480. Likewise, the principal point position (X1, Y1) of the projector 101 is calculated based on horizontal coordinates of a light projection sensor. Also, the distance L between the projector 101 and camera 102 is the base length, which assumes a value determined based on the configuration conditions of the apparatus. The boundary position (X, Y, Z) on the object 103 can be calculated by the principle of triangulation from these parameters. By calculating boundary positions (X, Y, Z) for the entire surface of the object 103, a three-dimensional shape of the object 103 can be measured.

Next, the stripe pattern light shape will be described below. Stripe pattern light of a binary code called a gray code having a coding error resistance will be described below with reference to FIG. 2. A portion which is observed as black on a captured reflected pattern corresponds to "0", and that which is observed as white corresponds to "1". In a pattern 201, the entire pattern is divided into two regions, which are encoded as "1" and "0". In a pattern 202, four regions of bright and dark portions are encoded as "1", "0", "0", and "1", and corresponding stripe pattern light is irradiated to capture an image of the corresponding pattern. Furthermore, in a pattern 203, eight regions are encoded as "1", "0", "0", "1", "1", "0", "0", and "1", and corresponding stripe pattern light is irradiated to capture an image of the corresponding pattern. In this way, since encoded region numbers are assigned to respective regions, the respective regions can be judged. The respective regions can be judged as (1, 1, 1), (1, 1, 0), (1, 0, 0), (1, 0, 1), (0, 0, 1), (0, 0, 0), (0, 1, 0), and (0, 1, 1). Since a space can be divided into eight regions using the three patterns of stripe pattern light in this manner, this spatial coding will be referred to as 3-bit spatial coding hereinafter. Then, the respective patterns of stripe pattern light shown in FIG. 2 will be respectively referred to as 1-bit stripe pattern light, 2-bit stripe pattern light, and 3-bit stripe pattern light hereinafter.

In order to perform a three-dimensional shape measurement in more detail, n patterns of stripe pattern light are irradiated while sequentially reducing regions of bright and dark portions in size. Then, by assigning region numbers obtained by dividing an irradiation region of the projector into 2n regions, the respective regions can be judged. In a three-dimensional measurement which uses 1024 divided regions, 10-bit spatial coding is attained.

A merit of the gray code lies in that even when a coding error occurs at a region boundary due to a shift or blur of stripe pattern light, such an error is merely judged as a neighboring region, and does not cause any coding error as a largely shifted region. For this reason, the spatial coding method using the gray code is popularly used.

In order to improve the precision in the three-dimensional measurement by the spatial coding method, a horizontal coordinate position x of a boundary between bright and dark portions (to be referred to as "boundary position" hereinafter) has to be determined from captured image data. The boundary position between bright and dark portions will be described below with reference to FIGS. 3A and 3B. FIGS. 3A and 3B are graphs when the ordinate plots luminance values of image data obtained by capturing an image of 2-bit stripe pattern light, and the abscissa plots the horizontal coordinates x. FIG. 3A shows ideal boundary positions. In FIG. 3A, since the bright and dark portions have different luminance values "1" and "0" at boundaries, the boundary positions between the bright and dark portions are uniquely determined, and positions a and b can be determined as boundary positions. However, in an actual measurement, a moderate change is observed in the vicinity of each boundary due to the influences of, for example, a blur of stripe pattern light, a reflectance of an object, and external light, as shown in FIG. 3B, and boundary positions cannot be uniquely determined, thus causing measurement errors.

In order to avoid such problem, a method which gives a reliability which indicates a measurement precision level to each measurement point, and does not use measured coordinates if the reliability of the coordinates is equal to or lower than a threshold is disclosed (for example, see Japanese Patent No. 3996560).

In the Japanese Patent No. 3996560, an object is irradiated with full-illumination light corresponding to a bright portion on the entire pattern and full-extinction light corresponding to a dark portion on the entire pattern in addition to stripe pattern light. The reliability is calculated as a ratio of a luminance difference of the stripe pattern light to that between the full-illumination light and full-extinction light. Then, only measurement points whose reliabilities exceed the threshold are output.

In the invention of the Japanese Patent No. 3996560, the luminance difference of the stripe pattern light has to be calculated. In order to precisely calculate the luminance difference, a luminance curve has to be calculated using luminance values of a plurality of pixels, resulting in high computation cost. A method of calculating a luminance difference by deciding sampling points in advance is available. However, in this case, respective sampling points have different reliabilities, and the reliabilities cannot be precisely reflected.

SUMMARY OF INVENTION

The present invention provides, in consideration of the above problems, a technique which can easily and precisely calculate a reliability indicating a measurement precision level.

According to one aspect of the present invention, there is provided a three-dimensional measurement apparatus for calculating three-dimensional shape information of a target object based on reflected pattern light of pattern light which is projected onto the target object and is reflected by the target object, comprising: capturing means for capturing reflected pattern light of stripe pattern light formed by alternately arranging a bright portion and a dark portion as first image data, and capturing reflected pattern light of reversed stripe pattern light formed by reversing the bright portion and the dark portion of the stripe pattern light as second image data; determination means for determining a boundary position between the bright portion and the dark portion based on the first image data and the second image data; and reliability calculation means for calculating a reliability indicating accuracy of the boundary position from a correlation between a first luminance gradient of the first image data and a second luminance gradient of the second image data.

According to one aspect of the present invention, there is provided a three-dimensional measurement apparatus for calculating three-dimensional shape information of a target object based on reflected pattern light of pattern light which is projected onto the target object and is reflected by the target object, comprising: capturing means for capturing reflected pattern light of stripe pattern light formed by alternately arranging a bright portion and a dark portion as first image data, capturing reflected pattern light of full-illumination pattern light formed by only a bright portion as second image data, and capturing reflected pattern light of full-extinction pattern light formed by only a dark portion as third image data; determination means for determining a boundary position between the bright portion and the dark portion based on the first image data, the second image data, and the third image data; and reliability calculation means for calculating a reliability indicating accuracy of the boundary position from the second image data and the third image data, and a luminance gradient of the first image data.

Further features of the present invention will become apparent from the following description of exemplary embodiments (with reference to the attached drawings).

DESCRIPTION OF EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
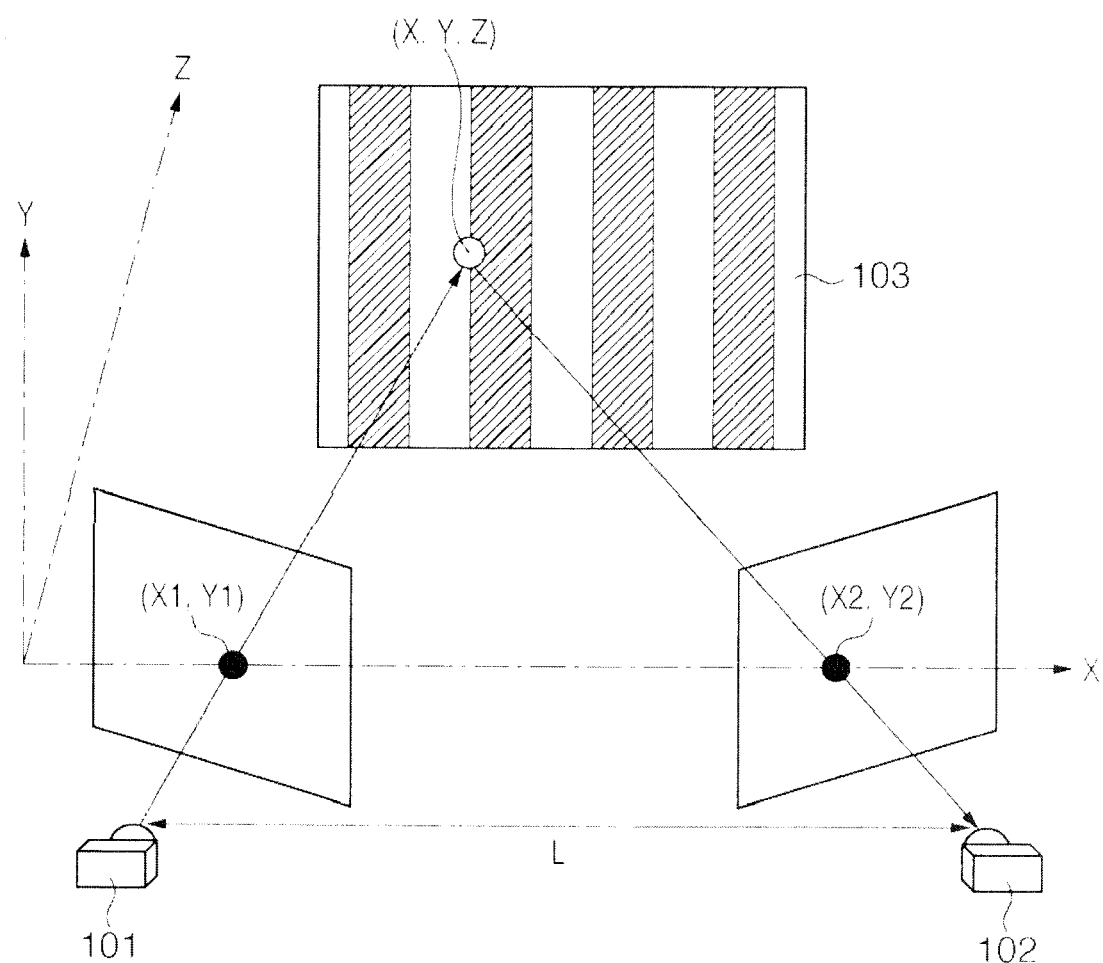
FIG. 1 is a view showing the arrangement of a three-dimensional shape measurement apparatus and the concept of a measurement method.
Figure 2:
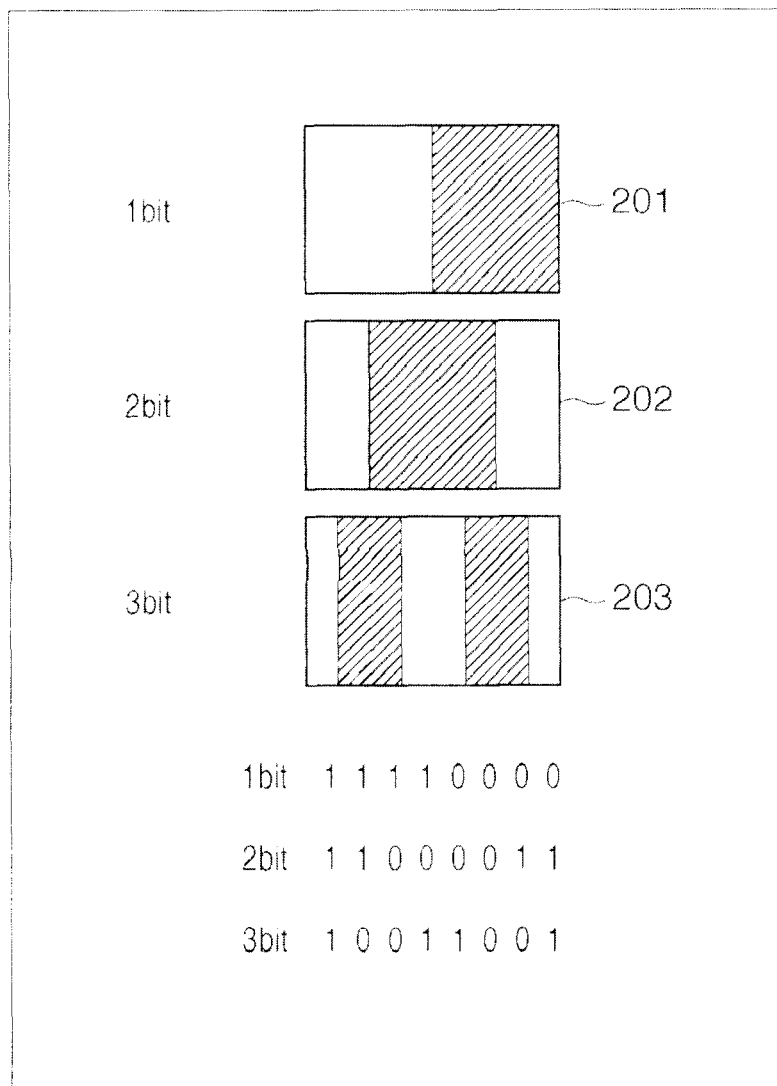
FIG. 2 is a view showing stripe pattern light projected by a spatial coding method using a gray code.
Figure 3A:
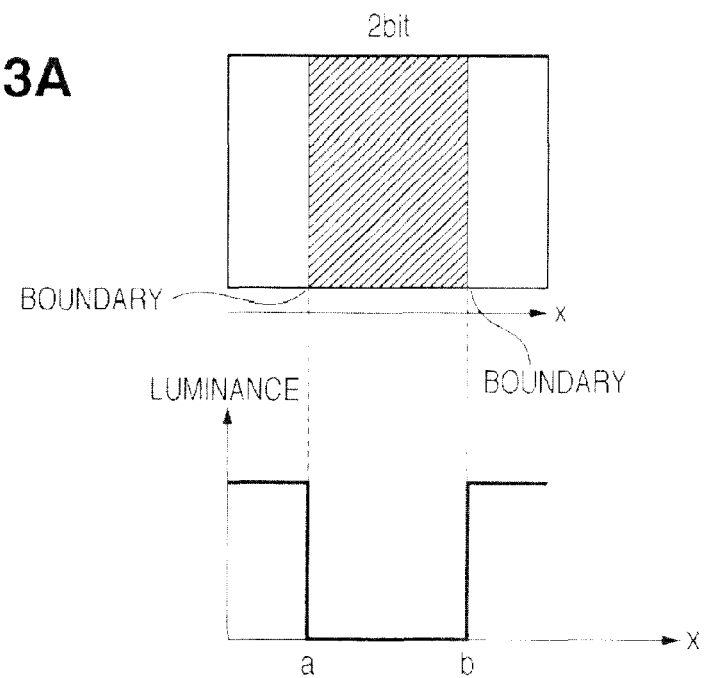
FIGS. 3A and 3B are graphs for explaining boundary positions.
Figure 3B:
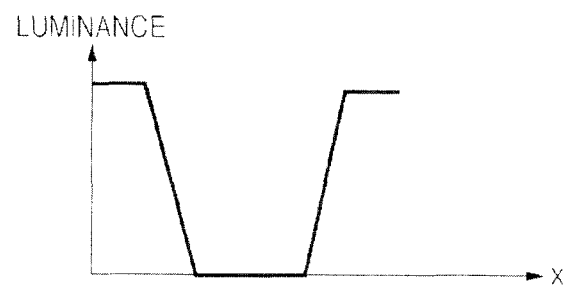
Figure 4:
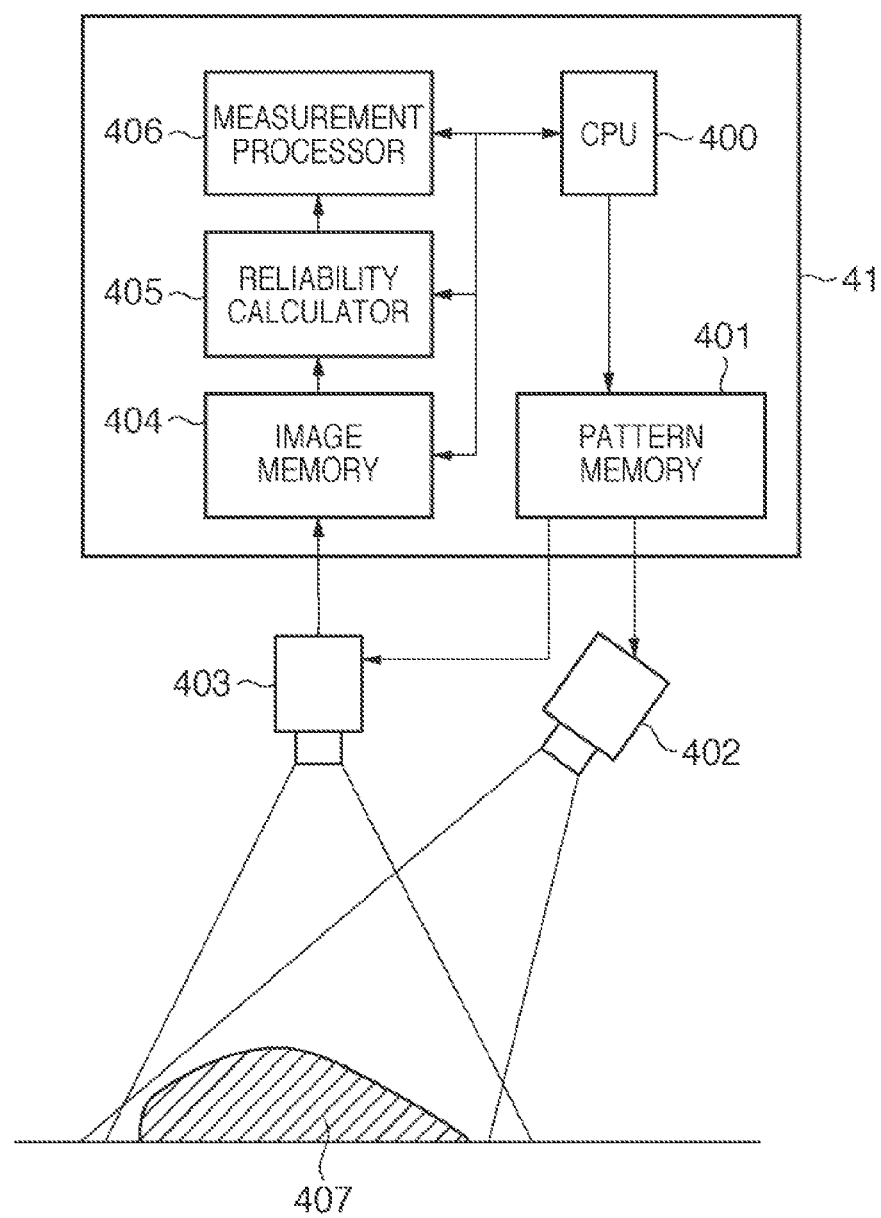
FIG. 4 is a schematic diagram of the basic arrangement.

The basic arrangement of a three-dimensional shape measurement apparatus according to the present invention will be described below with reference to FIG. 4. The three-dimensional measurement apparatus includes a projector 402 which projects stripe pattern light formed by alternately arranging bright and dark portions onto an object 407, a camera 403 which captures an image of reflected pattern light of the object 407 (target object) on which the stripe pattern light is projected, and a computation processing unit 41 which executes various arithmetic operations. The computation processing unit 41 instructs to project and capture the stripe pattern light, and executes computation processing of captured image data.

The computation processing unit 41 includes a CPU 400, pattern memory 401, image memory 404, reliability calculator 405, and measurement processor 406. The CPU 400 executes various arithmetic operations. The pattern memory 401 includes, for example, a ROM, and stores, for example, a pattern shape program of stripe pattern light, and a time account program required to set a projection time. Upon reception of a projection instruction from the CPU 400, the pattern memory 401 sends a stripe pattern light shape signal to the projector 402. Also, a time account signal is sent to the projector 402 and camera 403, thereby managing projection and capturing timings of stripe pattern light.

Image data captured by the camera 403 are temporarily stored in the image memory 404, and are sequentially sent to the reliability calculator 405. The reliability calculator 405 includes, for example, a ROM and RAM, and executes processing for determining boundary positions between bright and dark portions of the stripe pattern light, and calculating reliabilities of the boundary positions. A method of determining boundary positions, and a method of calculating reliabilities will be described later.

Next, the image data are sent to the measurement processor 406. The measurement processor 406 calculates three-dimensional position information from the image data. The measurement processor 406 includes, for example, a ROM and RAM. The measurement processor 406 stores device-dependent parameters such as the base length between the projector 402 and camera 403, a focal length, and the number of pixels, and external parameters such as distortion based on calibration which is executed in advance, and external light luminance data. Also, the measurement processor 406 stores a three-dimensional measurement program based on triangulation. The measurement processor 406 binarizes image data to generate code data. When N-bit spatial coding is to be attained, the stripe pattern light includes N different pattern shapes, and N patterns of code data are generated. The data are given with the reliabilities and boundary positions which are calculated by the reliability calculator 405. A correspondence relationship between pixels of the projector 402 and those of the camera 403 is decided from the code data, and a three-dimensional measurement is executed based on the principle of triangulation, thereby acquiring three-dimensional shape information (three-dimensional shape calculation). The measurement result is generated as range image data according to the number of pixels of the camera 403. To the range image data, the reliabilities can be given as needed. The range image data is converted into an image by an output unit (not shown), and can be observed as a range image on a display unit (not shown).

All the processes of the image memory 404, reliability calculator 405, and measurement processor 406 are executed based on instructions from the CPU 400.

The reliability calculation method will be described below with reference to FIGS. 5A to 5C.

Figure 5A:
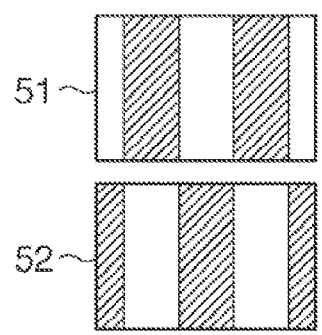
FIGS. 5A to 5C are views showing reliability calculations according to the first embodiment.
Figure 5B:
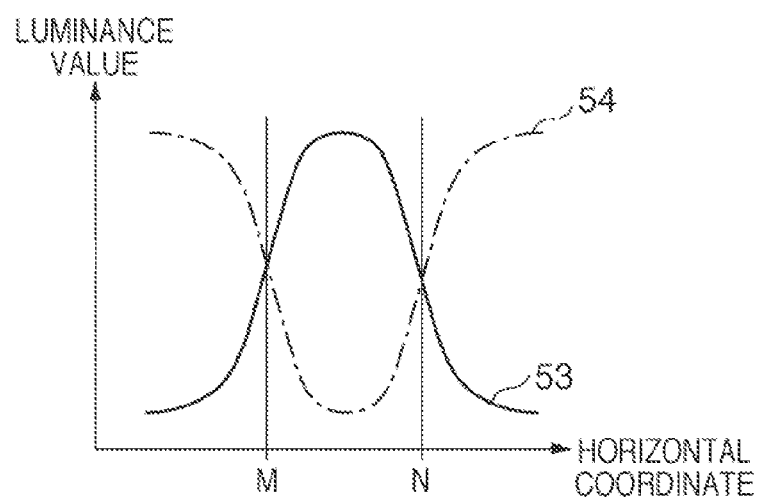

FIG. 5A shows stripe pattern light to be projected. Stripe pattern light 51 is that of spatial coding based on a 3-bit gray code, and will be referred to as a positive pattern hereinafter. Stripe pattern light 52 is reversed stripe pattern light obtained by reversing bright and dark portions of the stripe pattern light 51, and will be referred to as a negative pattern hereinafter. FIG. 5A exemplifies the positive and negative patterns of 3-bit stripe pattern light. However, in actual measurements based on spatial coding, for example, positive and negative patterns from 1 bit to 10 bits of stripe pattern light may be projected according to the resolution of the projector, and their images may be captured. That is, in case of 10-bit measurements, 20 images have to be captured. The concept of determining a boundary position will be described below with reference to FIG. 5B. FIG. 5B is a graph in which the ordinate plots luminance values of captured image data, and the abscissa plots horizontal pixel coordinates. Assume that image data obtained by capturing reflected pattern light of the stripe pattern light is defined as first image data. Likewise, assume that image data obtained by capturing reflected pattern light of the reversed stripe pattern light is defined as second image data. A luminance curve 53 is that of a portion of the first image data captured by projecting the stripe pattern light 51. On the other hand, a luminance curve 54 is that of the second image data captured by projecting the reversed stripe pattern light 52, and has the same relative positions of horizontal pixel coordinates as those of the luminance curve 53. The luminance curves 53 and 54 intersect at positions M and N. Hence, the positions M and N are determined as boundary positions. An actual boundary position computation method will be described below with reference to FIG. 5C. Pixel numbers are set below a graph, and points 55 and 56 correspond to the s-th and (s+1)-th pixels of image data captured by projecting the stripe pattern light 51. Points 57 and 58 correspond to the s-th and (s+1)-th pixels of image data captured by projecting the stripe pattern light 52. The points 55 and 56 and the points 57 and 58 are respectively coupled by lines, and a horizontal coordinate of an intersection 59 between line segments 500 and 501 is calculated. In this way, the boundary position N is calculated. In this case, reliability is defined as an angle φ formed when the line segments 500 and 501 intersect.

That is, first luminance values for the stripe pattern light 51 and second luminance values for the reversed stripe pattern light 52 are calculated for respective pixels which form the first and second image data (luminance value calculation). Then, a position corresponding to a pixel where the magnitude relationship between the first and second luminance values is inverted is determined as a boundary position between bright and dark portions. A first luminance gradient of the stripe pattern light 51 and a second luminance gradient of the reversed stripe pattern light 52 at the boundary position are calculated. Each luminance gradient calculation processing may be replaced by processing for calculating an inclination of each luminance curve at the boundary position. A correlation value indicating a correlation between the first and second luminance gradients is calculated as a reliability indicating accuracy of the boundary position. Note that the correlation value (reliability) may be, for example, a degree of matching between the line segments 500 and 501 at the boundary position of luminance curves obtained by plotting respective luminance values in addition to the angle φ.

The calculation method of the angle φ as the reliability will be described in detail below.

Assume that coordinates of respective points are respectively (Xa, Ya) as the point 55, (Xb, Yb) as the point 56, (Xa, Yd) as the point 57, and (Xb, Yc) as the point 58. An intersection between the line segments 500 and 501 is defined by (Px, Py) as the point 59.

An inclination $P_1$ of the line segment 500 is calculated as:

$$P_1 = Yb - Ya \mid Xb - Xa \quad (1)$$

An inclination $P_2$ of the line segment 501 is calculated as:

$$P_2 = Yc - Yd \mid Xb - Xa \quad (2)$$

From equations (1) and (2), an equation of a line which passes through the line segment 500 is expressed by:

$$y = \frac{Yb - Ya}{Xb - Xa}(x - Xa) + Ya \quad (3)$$

Likewise, an equation of a line which passes through the line segment 501 is expressed by:

$$y = \frac{Yc - Yd}{Xb - Xa}(x - Xa) + Yd \quad (4)$$

From equations (3) and (4), the coordinates (Px, Py) of the point 59 are respectively expressed by:

$$Px = \frac{(Ya - Yd)(Xb - Xa)}{Yc - Yb + Ya - Yd} + Xa \quad (5)$$

$$Py = \frac{(Ya - Yd)(Yb - Ya)}{Yc - Yb + Ya - Yd} + Ya \quad (6)$$

The boundary position is calculated by equation (5).

Figure 5C:
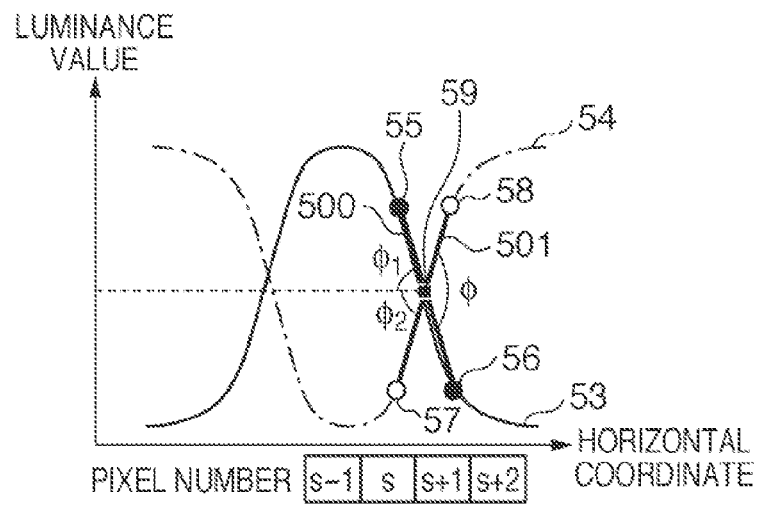

When the angle φ is divided into φ1 and φ2, as shown in FIG. 5C, from the coordinates of the respective points, φ1 is given by:

$$\phi_1 = \tan^{-1}\left(\frac{Ya - Yb}{Xb - Xa}\right) \quad (7)$$

φ2 is given by:

$$\phi_2 = \tan^{-1}\left(\frac{Yc - Yd}{Xb - Xa}\right) \quad (8)$$

From equations (7) and (8), the angle φ is calculated as:

$$\phi = \phi_1 + \phi_2 = \tan^{-1}\left(\frac{Ya - Yb}{Xb - Xa}\right) + \tan^{-1}\left(\frac{Yc - Yd}{Xb - Xa}\right) \quad (9)$$

In this case, if the distance between pixels is 1, since Xb−Xa=1, equation (9) can be expressed like:

$$\phi = \tan^{-1}(Ya - Yb) + \tan^{-1}(Yc - Yd) \quad (10)$$

In this way, the reliability φ (angle φ) is calculated.

The measurement processor 406 prohibits measurement points whose reliabilities are equal to or lower than a predetermined threshold from being output onto a range image based on the calculated reliabilities. Alternatively, the reliabilities may be given to respective measurement points of range image data, and all points may be output. Then, upon editing of the range image data, the user may arbitrary set a reliability threshold, thus obtaining range image data of only measurement points having desirably high reliabilities.

As described above, according to the first embodiment of the present invention, since an angle made by line segments obtained by coupling four points, which are closest to an inverted position of bright and dark regions, by lines from image data is defined as a reliability, the reliability can be calculated simultaneously with the calculation of a boundary position. The angle can be easily calculated using only luminance values of the four points.

In the first embodiment, the angle made by the line segments is used as the reliability. Also, a luminance value of an intersection (the point 59 in FIG. 5C) between the two line segments may be added as a second reliability. The luminance value of the point 59 can be calculated by equation (6). When the reliability is only defined by the angle, a luminance value of reflected light from a target cannot be detected. Even at the same angle, measurement precisions are different for high and low luminance values. A high luminance value equal to or larger than a threshold may often lead to a contrast drop, that is, a reliability drop. For this reason, the luminance value of the intersection between the two line segments is also used as a reliability, and determination is made together with the angle, thus further improving the determination precision based on the reliabilities.

Second Embodiment

This embodiment will explain a reliability calculation method of a spatial coding method using a positive pattern and uniform pattern light having a uniform light amount.

Figure 6A:
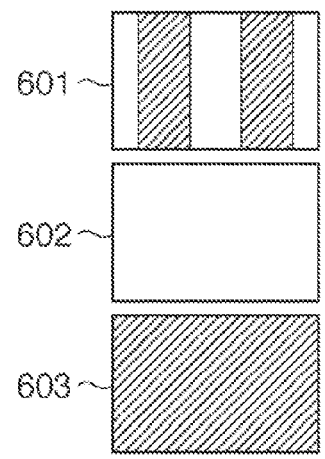
FIGS. 6A to 6C are views showing reliability calculations according to the second embodiment.

FIG. 6A shows stripe pattern light to be projected. Stripe pattern light 601 is that of spatial coding based on a 3-bit gray code. A pattern 602 is full-illumination pattern light of only a bright portion. A pattern 603 is full-extinction pattern light of only a dark portion. In order to attain 3-bit spatial coding, patterns from 1 bit to 3 bits of the stripe pattern light, the full-illumination pattern 602 of only a bright portion, and the full-extinction pattern 603 of only a dark portion are required. Assume that image data obtained by capturing reflected pattern light of the stripe pattern light is defined as first image data. Likewise, assume that image data obtained by capturing reflected pattern light of the full-illumination pattern light is defined as second image data. Also, assume that image data obtained by capturing reflected pattern light of the full-extinction pattern light is defined as third image data.

Figure 6B:
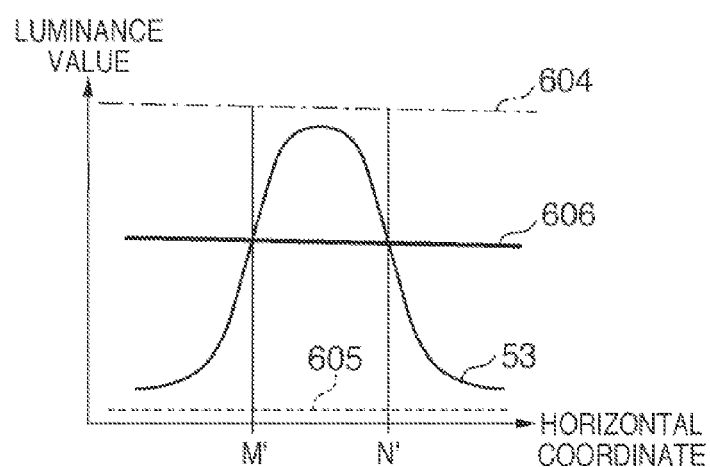

A method for determining boundary positions of the stripe pattern light 601 will be described below with reference to FIG. 6B. FIG. 6B is a graph in which the ordinate plots luminance values of captured image data, and the abscissa plots horizontal coordinates x.

A luminance curve 53 is that of the first image data captured by projecting the stripe pattern light 601 (first luminance value curve). A luminance line 604 is that of the second image data captured by projecting the full-illumination pattern 602 (second luminance value curve). A luminance line 605 is that of the third image data captured by projecting the full-extinction pattern 603 (third luminance value curve). An average luminance value of the luminance lines 604 and 605 is calculated as a luminance line 606. Assume that the luminance curve 53 of the stripe pattern light 601 intersects with the luminance line 606 of the average value at positions M' and N'. Hence, the positions M' and N' are determined as boundary positions.

Figure 6C:
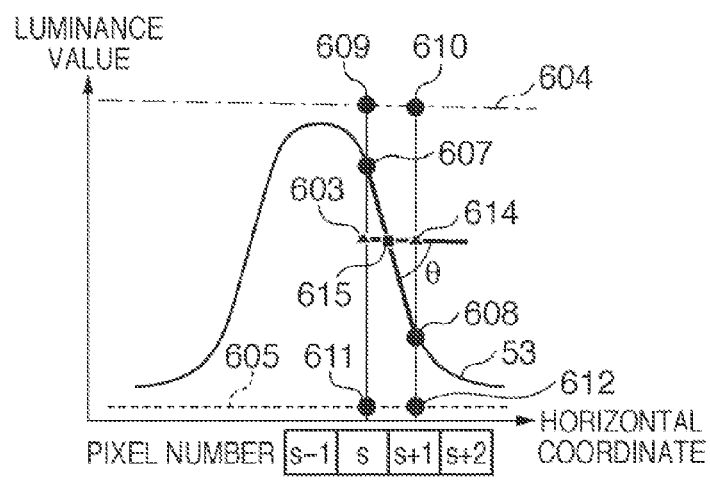

An actual calculation method will be described below with reference to FIG. 6C. Pixel numbers are set below a graph, and points 607 and 608 correspond to the s-th and (s+1)-th pixels of image data captured by projecting the stripe pattern light 601. Points 609 and 610 correspond to the s-th and (s+1)-th pixels of image data captured by projecting the full-illumination pattern 602. Points 611 and 612 correspond to the s-th and (s+1)-th pixels captured by projecting the full-extinction pattern 603. When average luminance values of corresponding pixels of the image data captured by projecting the full-illumination pattern 602 and full-extinction pattern 603 are calculated, an average value of the s-th points 609 and 611 is calculated as a point 613. Also, an average value of the (s+1)-th points 610 and 612 is calculated as a point 614. Then, the points 607 and 608 and the points 613 and 614 are coupled by lines, and a horizontal coordinate of an intersection 615 between these lines is calculated. In this manner, the boundary position N' can be calculated. In this case, a reliability is defined as an angle θ formed when the two lines intersect. As in the first embodiment, the angle θ can be calculated by equation (9). Note that the reliability may be defined by a luminance gradient, that is, an inclination at the boundary position in place of the angle θ.

In the second embodiment as well, a luminance value of the intersection (point 615) between the two line segments may be added as a second reliability.

As described above, according to the second embodiment, even in the spatial coding method using the positive pattern and uniform pattern light of the uniform light amount, the reliability can be calculated as in the first embodiment. This embodiment is effective for measurements which require high-speed processing rather than precision since the number of images to be captured can be nearly halved despite the reduction in precision.

Third Embodiment

The third embodiment will explain a reliability calculation method when pixels near an inverted position of bright and dark regions are selected.

Figure 7:
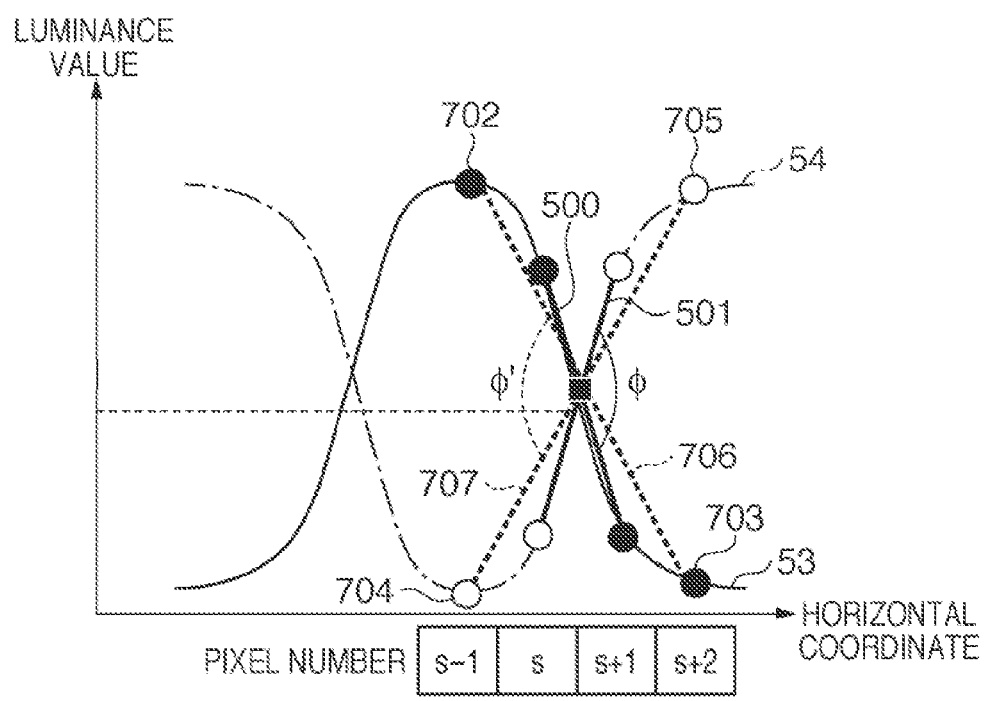
FIG. 7 is a view showing reliability calculations according to the third embodiment.

FIG. 7 is a graph in which the ordinate plots luminance values of captured image data, and the abscissa plots horizontal coordinates x. A luminance curve 53 is that of a portion of image data captured by projecting a positive pattern. A luminance curve 54 is that of image data captured by projecting a negative pattern. Assume that the luminance curve 54 has the same relative positions of horizontal pixel coordinates as those of the luminance curve 53. Line segments 500 and 501 are obtained by coupling luminance values of pixels, which are closest to an inverted position of bright and dark regions, that is, those of pixel numbers s and s+1, by lines. In this case, an intersecting angle φ between the line segments 500 and 501 is defined as a reliability.

In the above description, the pixels which are closest to the inverted position of the bright and dark regions are used. Alternatively, pixels having doubled pixel intervals may be selected. Points 702 and 703 correspond to the (s−1)-th and (s+2)-th pixels of image data captured by projecting the positive pattern. Points 704 and 705 correspond to the (s−1)-th and (s+2)-th pixels of image data captured by projecting the negative pattern. The points 702 and 703 and the points 704 and 705 are respectively coupled by lines to obtain line segments 706 and 707. In this case, an intersecting angle φ' between the line segments 706 and 707 is defined as a reliability.

Inclinations may be calculated using pixels which are spaced apart by an equal distance from the inverted position between the bright and dark regions like the (s−2)-th and (s+3)-th pixels or the (s−3)-th and (s+4)-th pixels by further broadening the pixel interval, and an angle made by line segments may be similarly defined as a reliability.

As described above, according to the third embodiment, a plurality of pixels located in the vicinity of the inverted position between the bright and dark regions can be selected. For this reason, a plurality of inclinations may be calculated, and their average value may be calculated as a reliability.

According to the present invention, since a reliability indicating a measurement precision is calculated using a plurality of pixels which are located in the vicinity of the inverted position between bright and dark portions from acquired image information, the reliability can be easily and precisely calculated. Since the reliability can be calculated simultaneously with the calculation of the boundary position, the computation processing can be speeded up.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-148026 filed on Jun. 29, 2010, which is hereby incorporated by reference herein in its entirety.

The invention claimed is:

1. A three-dimensional measurement apparatus for calculating three-dimensional shape information of a target object based on a reflected pattern of a pattern which is projected onto the target object and is reflected by the target object, comprising:

an obtaining unit configured to obtain a reflected pattern of a stripe pattern formed by alternately arranging a bright portion and a dark portion as first image data, and obtain the reflected pattern of a reversed stripe pattern formed by reversing the bright portion and the dark portion of the stripe pattern as second image data;

a determining unit configured to determine a boundary position between the bright portion and the dark portion based on the first image data and the second image data; and a reliability obtaining unit configured to obtain a reliability indicating accuracy of the boundary position based on a first pixel value included in the first image data and a second pixel value included in second image data.

2. The apparatus according to claim 1, wherein said reliability obtaining unit obtains the reliability based on an angle made by a line corresponding to the first pixel value gradient of the first image and a line corresponding to the second pixel value gradient of the second image.

3. The apparatus according to claim 1, wherein said reliability obtaining unit further obtains a luminance value at the boundary position as a second reliability, and
said apparatus further comprises a prohibition unit configured to, when the reliability is not less than a threshold, prohibit a position corresponding to the boundary position from being displayed on a display unit.

4. The apparatus according to claim 1, further comprising a projection unit configured to project the stripe pattern onto the target object.

5. The apparatus according to claim 1, wherein said reliability obtaining unit obtains the reliability indicating accuracy of the boundary position based on pixel values of at least two pixels near the boundary position among pixels included in the first image data and pixel values of at least two pixels near the boundary position among pixels included in the second image data.

6. The apparatus according to claim 1, wherein said reliability obtaining unit obtains a first line representing a change of the first pixel value using pixel values of at least two pixels near the boundary position among pixels included in the first image data, obtains a second line representing a change of the second pixel value using pixel values of at least two pixels near the boundary position among pixels included in the second image data, and obtains the reliability based on an angle formed by the first line and the second line.

7. The apparatus according to claim 1, wherein said determining unit determines, as the boundary position, a pixel position at which a line representing a change of the first pixel value and a line representing a change of the second pixel value cross.

8. The apparatus according to claim 1, further comprising a calculation unit configured to calculate three dimensional shape information, for each position corresponding to the boundary position, by a principle of triangulation using a position of a projection unit which projects the pattern and a position of the obtaining unit.

9. The apparatus according to claim 1, further comprising a prohibit unit configured to prohibit output of three dimensional shape information for a position corresponding to the boundary position, in a case where the reliability of the boundary position is not more than a threshold.

10. The apparatus according to claim 9, further comprising a threshold obtaining unit configured to obtain the threshold based on a user instruction.

11. The apparatus according to claim 1, wherein the pixel value is a luminance value.

12. A three-dimensional measurement apparatus for calculating three-dimensional shape information of a target object based on a reflected pattern of a pattern which is projected onto the target object and is reflected by the target object, comprising:

an obtaining unit configured to obtain the reflected pattern of a stripe pattern formed by alternately arranging a bright portion and a dark portion as first image data, and obtain a reflected pattern of full-illumination pattern formed by only a bright portion as second image data, and obtain a reflected pattern of full-extinction pattern formed by only a dark portion as third image data;

a determining unit configured to determine a boundary position between the bright portion and the dark portion based on the first image data, the second image data, and the third image data; and a reliability obtaining unit configured to obtain a reliability indicating accuracy of the boundary position based on a pixel value of the first image data, the second image data and the third image data.

13. The apparatus according to claim 12, wherein said reliability obtaining unit obtains the reliability based on an angle made by a first pixel value gradient of the stripe pattern and a second pixel value gradient of a reversed stripe pattern formed by reversing the bright portion and the dark portion of the stripe pattern, or an angle made by the first pixel value gradient of the stripe pattern and a luminance gradient of average pixel values obtained by averaging the full-illumination pattern and the full-extinction pattern.

14. The apparatus according to claim 12, wherein said determining unit determines the boundary position between the bright portion and the dark portion based on a first line representing a change of a pixel value included in the first image data and a second line representing a change of an average pixel value of pixel values included in the second image data and pixel values included in the third image data.

15. The apparatus according to claim 14, wherein said reliability obtaining unit obtains the reliability based on the first line and the second line.

16. The apparatus according to claim 12, further comprising a calculation unit configured to calculate three dimensional shape information, for each position corresponding to the boundary position, by a principle of triangulation using a position of a projection unit which projects the pattern and a position of the obtaining unit.

17. The apparatus according to claim 12, further comprising a prohibit unit configured to prohibit an output of three dimensional shape information for a position corresponding to the boundary position, in a case where the reliability of the boundary position is not more than a threshold.

18. The apparatus according to claim 17, further comprising a threshold obtaining unit configured to obtain the threshold based on a user instruction.

19. The apparatus according to claim 12, wherein the pixel value is a luminance value.

20. A three-dimensional measurement method for calculating three-dimensional shape information of a target object based on a reflected pattern of a pattern which is projected onto the target object and is reflected by the target object, comprising:

an obtaining step of obtaining a reflected pattern of a stripe pattern formed by alternately arranging a bright portion and a dark portion as first image data, and obtaining a reflected pattern of a reversed stripe pattern formed by reversing the bright portion and the dark portion of the stripe pattern as second image data;

a determination step of determining a boundary position between the bright portion and the dark portion based on the first image data and the second image data; and a reliability obtaining step of obtaining a reliability indicating accuracy of the boundary position based on a first pixel value included in the first image data and a second pixel value included in the second image data.

21. A non-transitory computer-readable storage medium storing a computer program for controlling a computer to execute a three-dimensional measurement method according to claim 20.

22. A three-dimensional measurement method for calculating three-dimensional shape information of a target object based on reflected pattern of pattern which is projected onto the target object and is reflected by the target object, comprising:

an obtaining step of obtaining a reflected pattern of a stripe pattern formed by alternately arranging a bright portion and a dark portion as first image data, obtaining a reflected pattern of a full-illumination pattern formed by only a bright portion as second image data, and obtaining a reflected pattern of a full-extinction pattern formed by only a dark portion as third image data;

a determination step of determining a boundary position between the bright portion and the dark portion based on the first image data, the second image data, and the third image data; and a reliability obtaining step of obtaining a reliability indicating accuracy of the boundary position based on a pixel value of the first image data, the second image data and the third image data.

23. A non-transitory computer-readable storage medium storing a computer program for controlling a computer to execute a three-dimensional measurement method according to claim 22.

* * * * *